May 3, 1927.
W. SETZEPFAND
TELEPHONE SYSTEM
Filed June 26, 1926
1,627,206
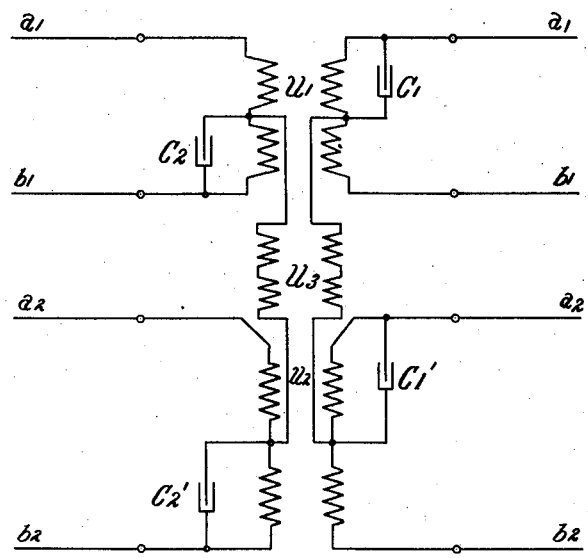
Inventor
Werner Setzepfand
R.S. Richardson Atty.

Patented May 3, 1927.

1,627,206

UNITED STATES PATENT OFFICE.

WERNER SETZEPFAND, OF BERLIN, GERMANY, ASSIGNOR TO SIEMENS & HALSKE AKTIENGESELLSCHAFT, OF SIEMENSSTADT, NEAR BERLIN, GERMANY.

TELEPHONE SYSTEM.

Application filed June 26, 1926, Serial No. 118,646, and in Germany July 6, 1925.

My invention relates in general to methods of constructing repeating coils, and more in particular to methods of constructing repeating coils which have a high degree of symmetry and balance.

In telephony, repeaters are used for making phantom circuits and they form tapping coils. For this purpose, repeaters are needed having their windings completely symmetrical to the tapping point, otherwise cross-talk would occur. This symmetry must be present for the absolute values and for the variations. In the ordinary repeaters it is comparatively easy to make the absolute values symmetrical. But the capacities of the different coils cause phase variations, which render the symmetrical values of the repeaters worse. Various methods of winding are known, which enable the capacities of the coils to be made equal. But all of them require special preliminary work to be done on the prepared wire or special measures to be taken during their construction which render the operation of winding delicate and expensive. If thereafter faults of any kind are found while testing, the work that has been performed for increasing the symmetry of the values is lost.

These disadvantages are avoided by the balancing process, to which the invention relates; because it permits every ordinary tapping coil to be completely and symmetrically balanced without affecting its construction and its other electrical values, this being effected by adding suitable capacities to the circuit in order to adjust the difference in phase. The balancing takes place at the finished repeater, hence it need only be done at those tapping coils, that are used for obtaining the phantom circuit. Equalization is accomplished by adding one or more fixed condensers, which are preferably built into the casing.

The location and value of the condenser or condensers are determined by suitable electrical tests of the coils of the repeater. These tests are of such a character as to determine not only if a difference of phase exists, but also the degree of unbalance. Condensers of the proper values, approximately, are then connected around those coils where they are required.

The drawing shows, by way of example, a circuit, which has the phantom formed by means of repeaters that are made symmetrical according to the invention. The repeaters $U^1$ and $U^2$ are inserted in the physical leads $a^1$, $b^1$ and $a^2$, $b^2$. $U^3$ is the repeater for forming a phantom circuit from two pairs of physical leads $a^1$, $b^1$ and $a^2$, $b^2$. The symmetrical equalization according to the invention is obtained by means of the condensers $C^1$, $C^2$ and $C^{1\prime}$, $C^{2\prime}$.

What I claim is:

The process of constructing a repeating coil having two windings which are each symmetrical to a center tap, which consists in equalizing the windings during construction so far as the absolute values of resistance and inductance are concerned, but without special regard to phase differences due to capacity unbalance, in testing the finished repeating coil to determine if any capacity unbalance exists and the amount of such unbalance, and in adding condensers of the proper value and in shunt of the coils which require them, as indicated by the test, so as to make the finished repeater completely symmetrical.

In witness whereof, I hereunto subscribe my name this 2nd day of June, A. D. 1926.

WERNER SETZEPFAND.